(12) United States Patent
Nakano

(10) Patent No.: US 6,639,337 B1
(45) Date of Patent: Oct. 28, 2003

(54) MOTOR/GENERATOR WITH MULTIPLE ROTORS

(75) Inventor: Masaki Nakano, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/668,348

(22) Filed: Sep. 25, 2000

(30) Foreign Application Priority Data

Sep. 27, 1999 (JP) ............................................ 11-273303
Sep. 28, 1999 (JP) ............................................ 11-274874

(51) Int. Cl.⁷ ............................................. H02K 47/04
(52) U.S. Cl. ..................................... 310/113; 310/114
(58) Field of Search ................................ 310/113, 114, 310/129, 208, 216; 290/40 R, 40 A, 40 B, 45

(56) References Cited

U.S. PATENT DOCUMENTS

| | | | |
|---|---|---|---|
| 3,462,626 A | 8/1969 | Kluss | |
| 3,898,490 A | 8/1975 | Wedman | |
| 4,171,496 A | 10/1979 | Eriksson | |
| 4,503,349 A | 3/1985 | Miller | |
| 4,532,447 A | 7/1985 | Cibie | |
| 4,749,898 A | 6/1988 | Suzuki et al. | |
| 4,782,257 A | 11/1988 | Secher et al. | |
| 4,785,213 A * | 11/1988 | Satake | 310/116 |
| 5,117,141 A | 5/1992 | Hawsey et al. | |
| 5,124,606 A | 6/1992 | Eisenbeis | |
| 5,418,413 A * | 5/1995 | Satomi | 310/12 |
| 5,525,851 A | 6/1996 | Kumamoto et al. | |
| 5,668,430 A * | 9/1997 | Kolomeitsev | 310/266 |
| 5,936,312 A * | 8/1999 | Koide et al. | 290/40 R |
| 6,005,317 A | 12/1999 | Lamb | |
| 6,049,152 A | 4/2000 | Nakano | |
| 6,121,705 A | 9/2000 | Hoong | |
| 6,211,597 B1 | 4/2001 | Nakano | |
| 6,304,017 B1 | 10/2001 | Leupold | |
| 6,355,999 B1 | 3/2002 | Kichiji et al. | |
| 2001/0008354 A1 | 7/2001 | Minagawa | |

FOREIGN PATENT DOCUMENTS

JP          8-340663          12/1996

* cited by examiner

Primary Examiner—Thanh Lam
(74) Attorney, Agent, or Firm—Foley & Lardner

(57) ABSTRACT

A first rotor (2) rotating with the first rotation shaft (5) and having magnetic poles, and a second rotor (3) rotating with the second rotation shaft (4) and having a different number of magnetic poles to the first rotor (2) are provided. The first rotation shaft (5) and the second rotation shaft (4) are disposed co-axially and the first rotor (2) and the second rotor (3) are disposed in series in an axial direction. A stator (14) with a plurality of coils (16,16A,16B) is provided on an outer side of the first rotor (2) and the second rotor (3). The plurality of coils (16,16A,16B) generate a rotating magnetic field in synchronism with a magnetic field of the first rotor (2) due to the application of a first alternating current and generate a rotating magnetic field in synchronism with a magnetic field of the second rotor (3) due to the application of a second alternating current. The current control device (112, 115) drives the first and second rotors (2, 3) independently by supplying a composite current comprising the first alternating current and the second alternating current to the coils (16,16A,16B).

21 Claims, 14 Drawing Sheets

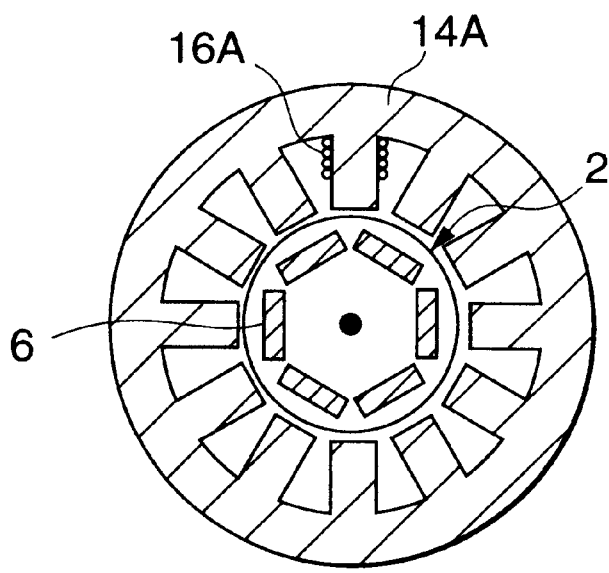 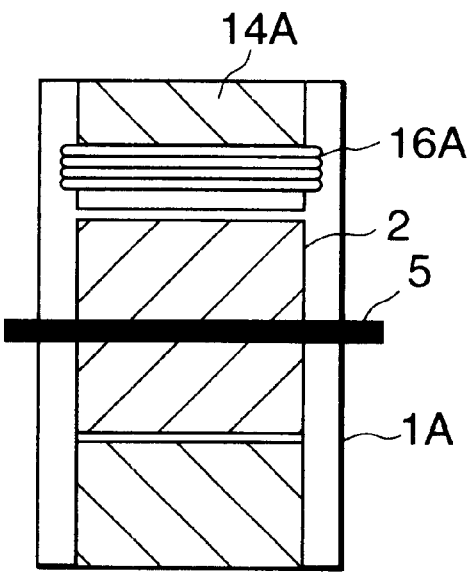
FIG. 14A    FIG. 14B
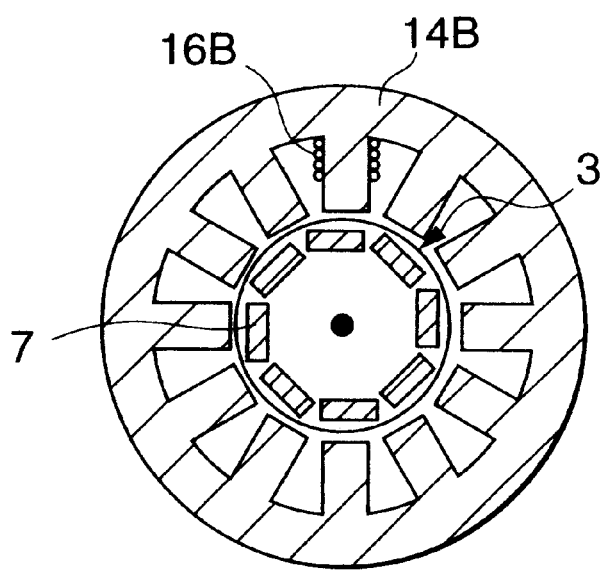 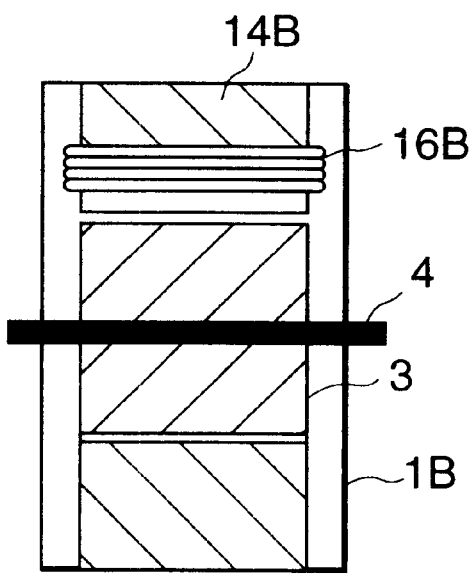
FIG. 14C    FIG. 14D

MOTOR/GENERATOR WITH MULTIPLE ROTORS

FIELD OF THE INVENTION

This invention relates to a motor/generator provided with a plurality of rotors.

BACKGROUND OF THE INVENTION

Tokkai-Hei-8-340663 published by the Japanese Patent Office in 1996 discloses a motor/generator having one stator and two rotors. The stator and rotors are disposed co-axially, one rotor being arranged on the inner side of the stator while the other rotor is disposed on the outer side of the stator.

In this motor/generator, the stator is provided with an independent group of coils for each rotor. Two groups of coils respectively drive the rotors by producing two different rotating magnetic fields.

SUMMARY OF THE INVENTION

In order to supply power currents of different waveforms to the two groups of coils, the motor/generator has two inverters. Accordingly, the construction of the motor/generator is complicated and the switching loss in the inverters is also large. Furthermore the overlapping disposition of the rotors on the inner and outer sides of the stator results in the stator requiring a cantilever support structure which has low structural stability.

It is therefore an object of this invention to reduce current loss of a motor/generator provided with a plurality of rotors.

It is a further object of this invention to increase the stability of the support for the stator of a motor/generator provided with a plurality of rotors.

In order to achieve the above objects, this invention provides a motor/generator comprising a first rotation shaft, a second rotation shaft, a first rotor, a second rotor, a stator and a current control device.

The first rotor rotates with the first rotation shaft and has a first number of magnetic poles that form a first magnetic field. The second rotation shaft rotates relative to the first rotation shaft and is supported co-axially with the first rotation shaft. The second rotor rotates with the second rotation shaft and has a second number of magnetic poles that form a second magnetic field.

The first number and the second number are different. The first rotor and the second rotor are disposed in series along the first rotation shaft. The stator comprises coils that generate a first rotating magnetic field in synchronism with the first magnetic field by application of a first alternating current, and generate a second rotating magnetic field in synchronism with the second magnetic field by application of a second alternating current. The current control device supplies a composite current comprising the first alternating current and the second alternating current to the coils.

This invention also provides a motor/generator comprising a first rotation shaft, a second rotation shaft, a first rotor, a second rotor, a first stator, a second stator and a current control device.

The first rotor rotates with the first rotation shaft and has a first number of magnetic poles that form a first magnetic field. The second rotation shaft rotates relative to the first rotation shaft. The second rotation shaft and the first rotation shaft have different rotation axes. The second rotor rotates with the second rotation shaft and has a second number of magnetic poles that form a second magnetic field. The first number and the second number are different. The first stator comprises a third number of first coils that generate a first rotating magnetic field in synchronism with the first magnetic field by application of a first alternating current. The second stator comprises a fourth number of second coils that generate a rotating magnetic field in synchronism with second magnetic field by application of a second alternating current. Herein, the third number is equal to the fourth number. The current control device supplies a composite current comprising the first alternating current and the second alternating current to both the first coils and the second coils.

The details as well as other features and advantages of this invention are set forth in the remainder of the specification and are shown in the accompanying drawings.

BRIEF DESCRIPTION OF THE DRAWINGS

FIGS. 14A–14D are schematic longitudinal sectional and cross-sectional views of a motor/generator according to a seventh embodiment of this invention.

DESCRIPTION OF THE PREFERRED EMBODIMENTS

Figure 1:
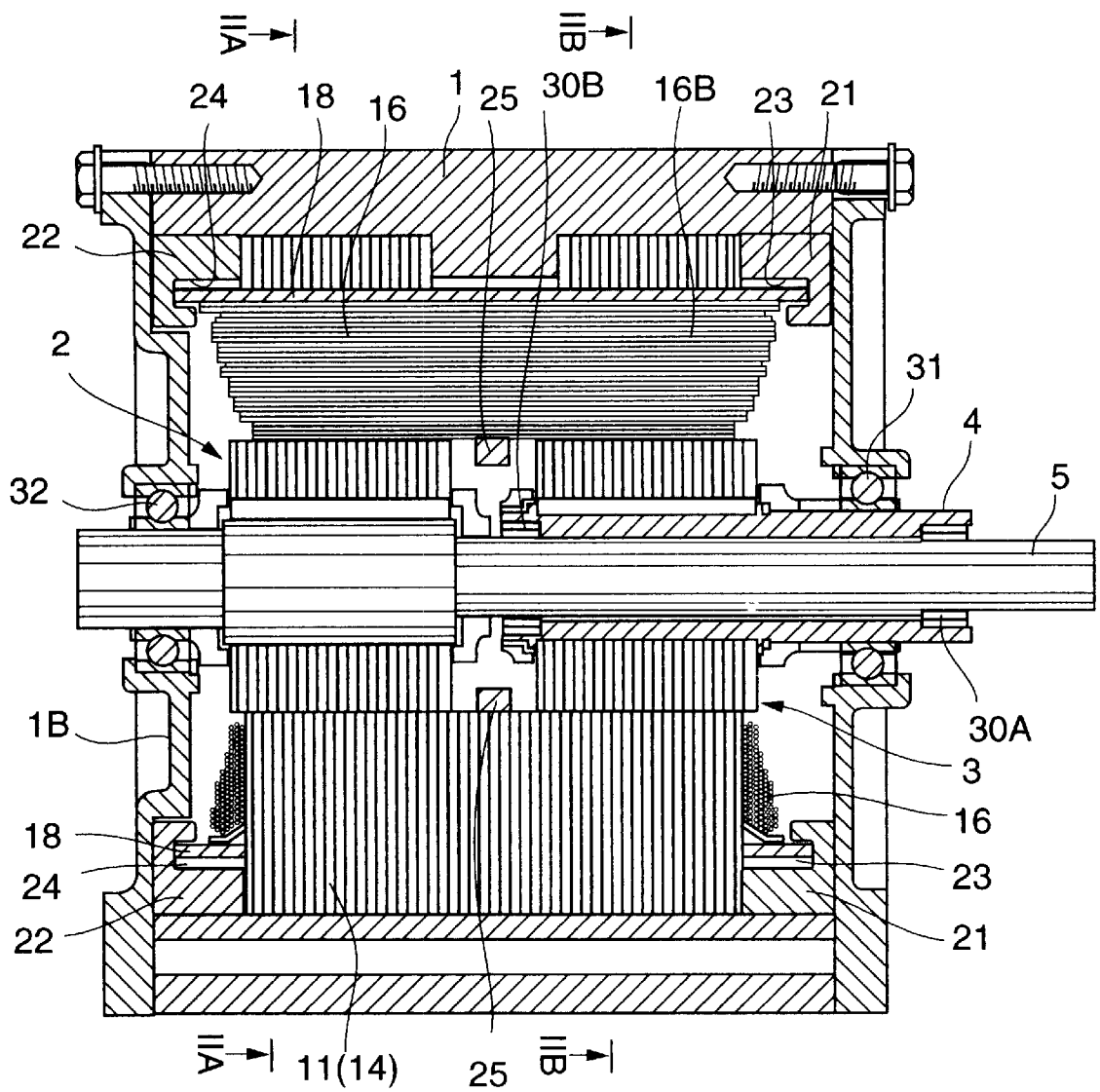
FIG. 1 is a longitudinal sectional view of a motor/generator according to this invention.
Figure 2:
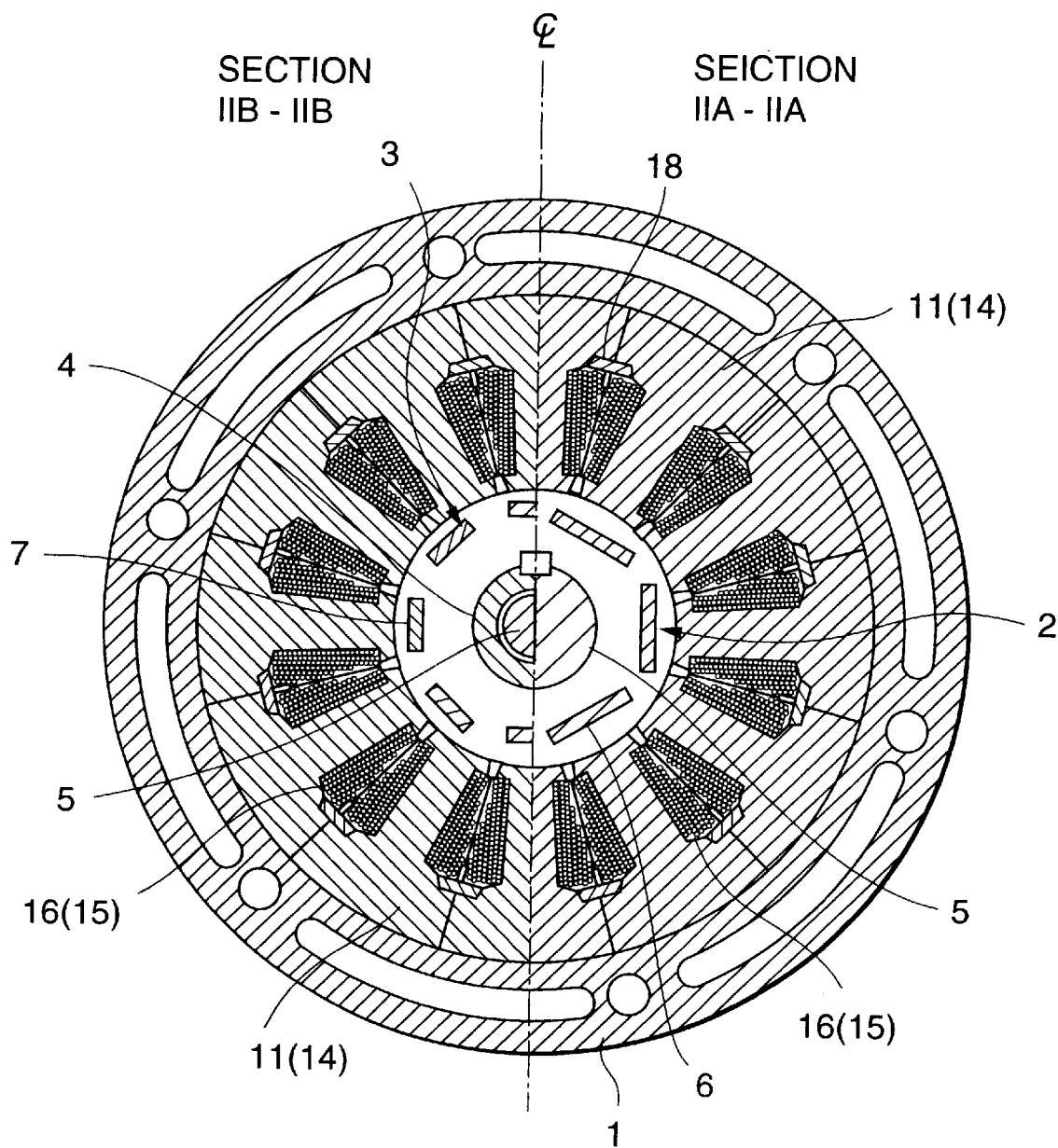
FIG. 2 is a cross-sectional view of the motor/generator along the line IIA—IIA and the line IIB—IIB in FIG. 1.

Referring to FIGS. 1 and 2, a motor/generator according to this invention is provided with a stator 14, a first rotor 2 and a second rotor 3.

The first rotor 2 is provided with a rotation shaft 4 and the second rotor 3 is provided with a rotation shaft 5. The rotation shaft 4 has a cylindrical shape and the rotation shaft 5 is fitted through the rotation shaft 4. The rotation shafts 4 and 5 are disposed co-axially. The inner periphery of both ends of the rotation shaft 5 is supported by the rotation shaft 4 through needle bearings 30A and 30B. The outer periphery of one end of the rotation shaft 4 is supported on the case 1 through a ball bearing 31. The outer periphery of one end of the rotation shaft 5, positioned opposite the ball bearing 31, is supported on the case 1 by a ball bearing 32.

The first rotor 2 comprises six magnets 6. The second rotor comprises eight magnets 7. However the number of magnets of the first rotor 2 and the second rotor 3 is not limited to the above number.

The stator 14 comprises twelve cores 11 which are disposed to cover the outer periphery of the first rotor 2 and the second rotor 3. Each core 11 is made of magnetic plate members laminated in the direction of the rotation shaft 5. A slot 15 is formed between adjacent cores 11 to provide a space for stator coils 16 that are wound on the cores 11.

The stator 14 is fitted inside the cylindrical case 1. Displacement of the cores 11 towards outer side is prevented by the case 1. Retaining plates 18 parallel to the rotation shaft 5 are disposed between each core 11.

A total of twelve retaining plates 18 are disposed on a circumferential periphery. Ring grooves 23 and 24 which are formed on rings 21 and 22 are press fitted inside both ends of these retaining plates 18.

The retaining plates both ends of which are thus retained by the ring rings 21 and 22 prevent the cores 11 from displacing to the inner side. The inner periphery of the cores 11 is also supported by a reinforcing ring 25 disposed between the first rotor 2 and the second rotor 3.

When assembled, the outer peripheral sections of adjacent cores 11 are in contact. On the other hand, the inner peripheral sections of the cores 11 project inwardly independently with stator coils 16 wound onto the projecting portions.

In this motor/generator, by supplying a first multi-phase alternating current having a phase difference of 90 degrees and a frequency determined by a required rotation speed of the first rotor 2, to the twelve stator coils 16, the stator 14 generates a first rotating magnetic field which has three pairs of magnetic poles and which synchronously rotates the first rotor 2 at the required rotation speed.

On the other hand, by supplying a second multi-phase alternating current having a phase difference of 120 degrees and a frequency determined by a required rotation speed of the second rotor 3, to the twelve stator coils 16, the stator 14 generate a second rotating magnetic field which has four pairs of magnetic poles and synchronously rotates the second rotor 3.

If a composite current of the first alternating current and the second alternating current is supplied to the twelve stator coils 16, the stator 14 simultaneously generates the first and second rotating magnetic fields which respectively rotate the first and second rotors 2, 3.

The principle of this operation is described in U.S. Pat. No. 6,049,152.

Figure 3:
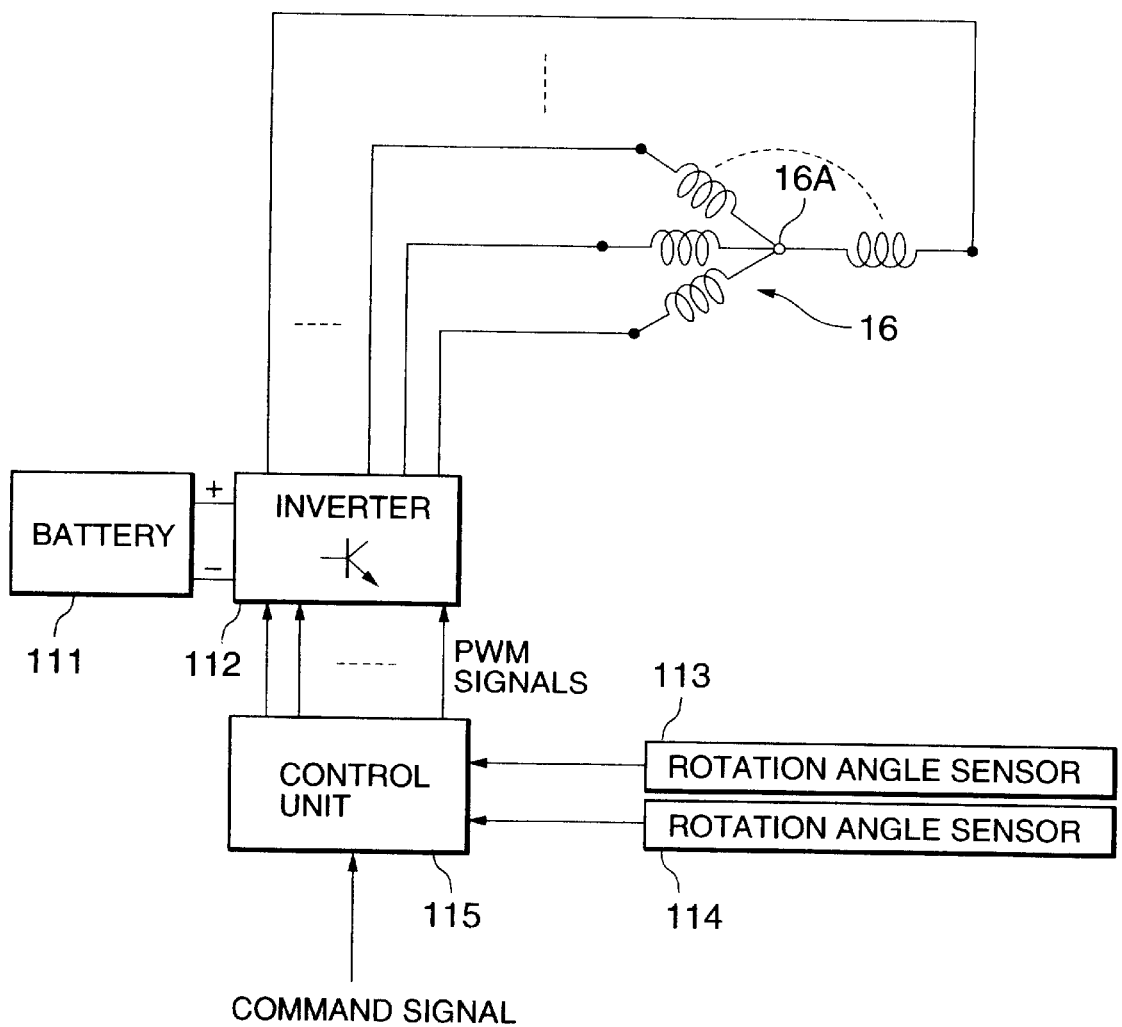
FIG. 3 is a block diagram of a current control device for the motor/generator according to this invention.

Control of the current supplied to the motor will be described with reference to FIG. 3.

The motor is provided with a battery 111, an inverter 112 and a control unit 115 in order to supply a composite alternating current to the stator coils 16. The inverter 112 may be obtained by expanding a normal three-phase bridge-type inverter into twelve phase and is provided with twelve output terminals. Each output terminal is connected respectively with twelve stator coils 16. The end of each stator coil 16 is connected to a terminating point 16A.

The sum of the instantaneous current at the terminating point 16A is always zero.

The inverter 112 comprises twenty-four transistors and the same number of diodes, and a pulse width modulation (PWM) signal from the control unit 115 is input to the base of each transistor.

Signals are input into the control unit 115 from a rotation angle sensor 113 detecting a rotation position of the first rotor 2 and a rotation angle sensor 114 detecting a rotation position of the second rotor 3. The rotation angle sensors 113 and 114 are formed by a rotary encoder or a resolver. The rotational torque required by the first rotor 2 and the second rotor 3 is input to the control unit 115 as a command signal. The control unit 115 outputs the PWM signals to the inverter 112 based on the command signal and the rotational positions of the first rotor 2 and the second rotor 3.

Since this motor/generator drives the two rotors 2 and 3 with one inverter 112 and one stator 14, it is possible to reduce the capacitance of the transistors in comparison with a motor/generator having two inverters and stators to drive two rotors. Reduced switching loss is attained as a result.

This invention may also be applied to a case where one of the first rotor 2 and the second rotor 3 serves as a generator for generating power while the other rotor serves as a motor rotating by the generated power. In this case, a current corresponding to the difference of the motor driving current and the generated current is supplied to the stator coils 16 from the inverter 112.

This electric power management much improves electrical efficiency of the motor/generator compared with the conventional electric power management in which power generated by a generator is once stored in a battery and a motor is driven by the power supplied from the battery.

Furthermore, since the first rotor 2 and the second rotor 3 are disposed in series along the rotation shaft 5 and the stator 14 is disposed on an outer side of the rotors 2 and 3, the stator 14 can be firmly secured to the case 1.

In addition, the first rotor 2 and the second rotor 3 are supported in a stable manner with respect to high velocity rotation since the needle bearings 30A and 30B and the ball bearings 31 and 32 support both ends of the rotation shafts 4 and 5.

Identical poles of the magnets of the rotors 2 and 3 are not opposed, so the demagnetization effect due to opposing identical poles does not occur. Therefore a deterioration in magnetic properties of the rotors 2, 3 can be prevented.

Figure 4:
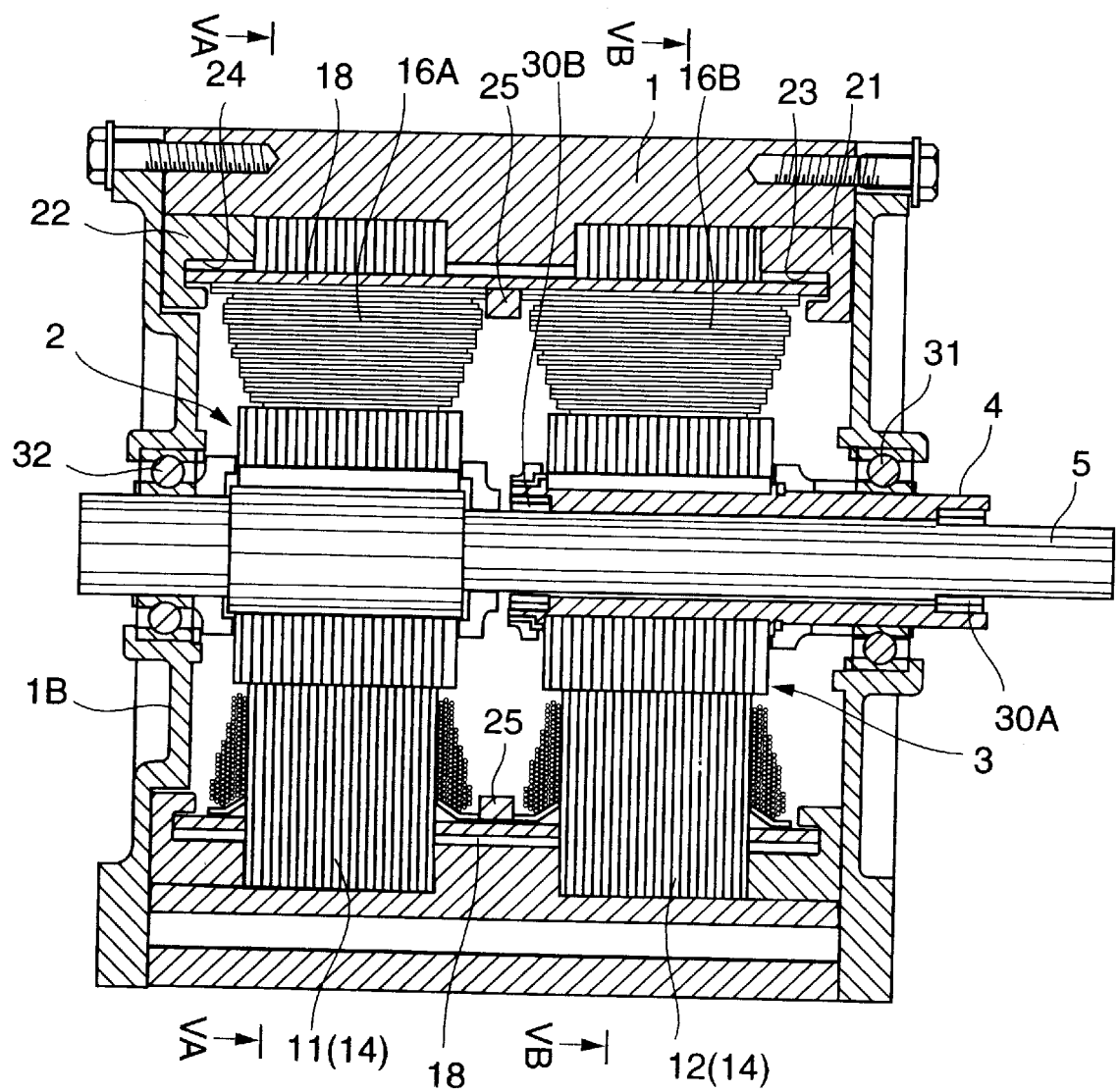
FIG. 4 is a longitudinal sectional view of a motor/generator according to a second embodiment of this invention.
Figure 5:
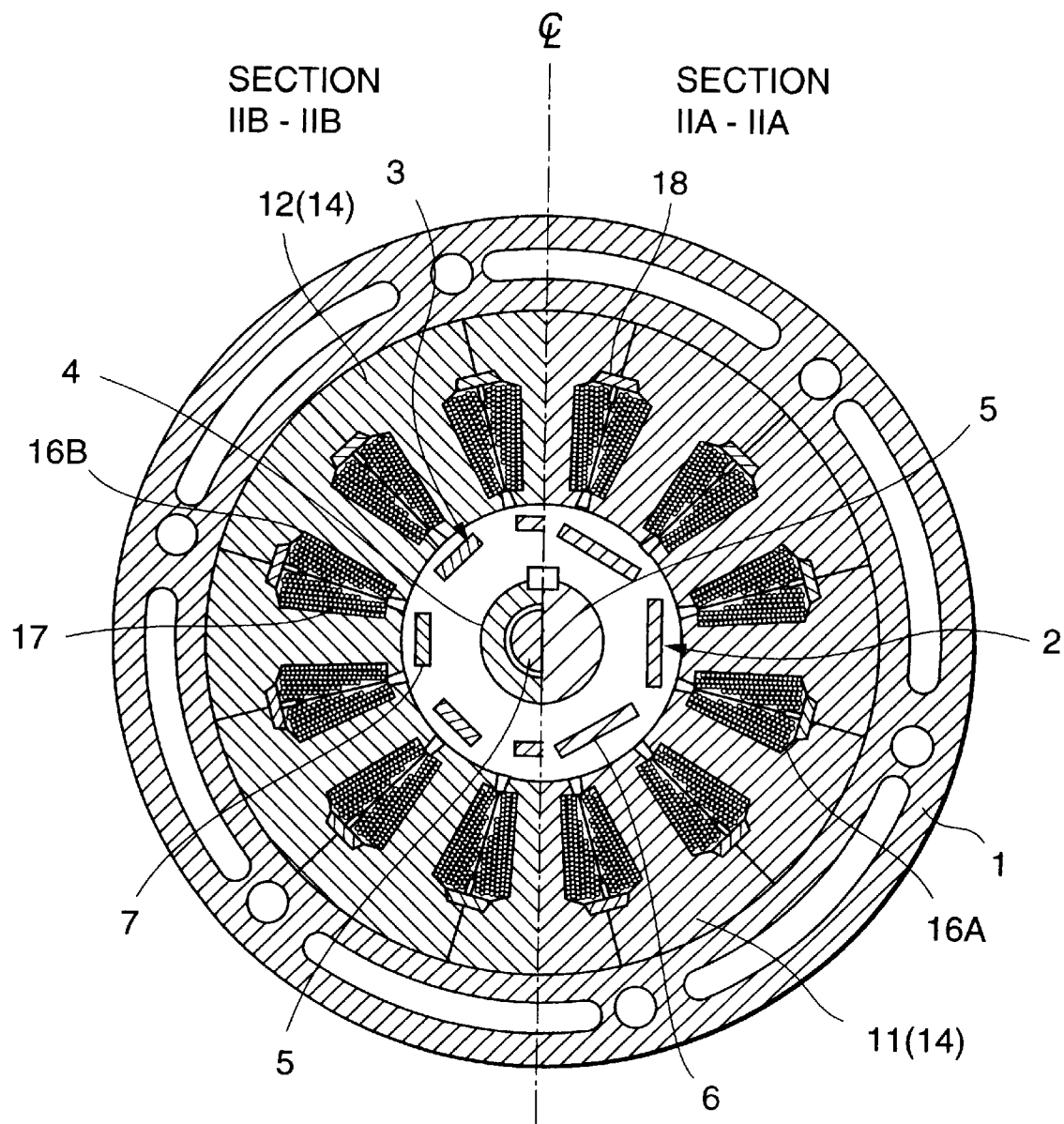
FIG. 5 is a cross-sectional view of the motor/generator according to the second embodiment of this invention taken along the line VA—VA and the line VB—VB in FIG. 4.

A second embodiment of this invention will be described with reference to FIGS. 4–6.

The motor/generator according to this embodiment differs from that of the first embodiment with respect to the structure of the stator 14. The stator 14 is provided with twelve first cores 11 facing the first rotor 2 and twelve second cores 12 facing the second rotor 3. Stator coils 16A are wound on the first cores 11. Stator coils 16B are wound onto the second cores 12. A reinforcing ring 25 is disposed between the first cores 11 and the second cores 12 so as to abut with the inner periphery of the retaining plates and prevent them from displacing towards the inner side. The reinforcing ring 25 also has the function of limiting displacement of the first cores 11 and the second cores 12 in the direction along the rotation shaft 5.

Figure 6:
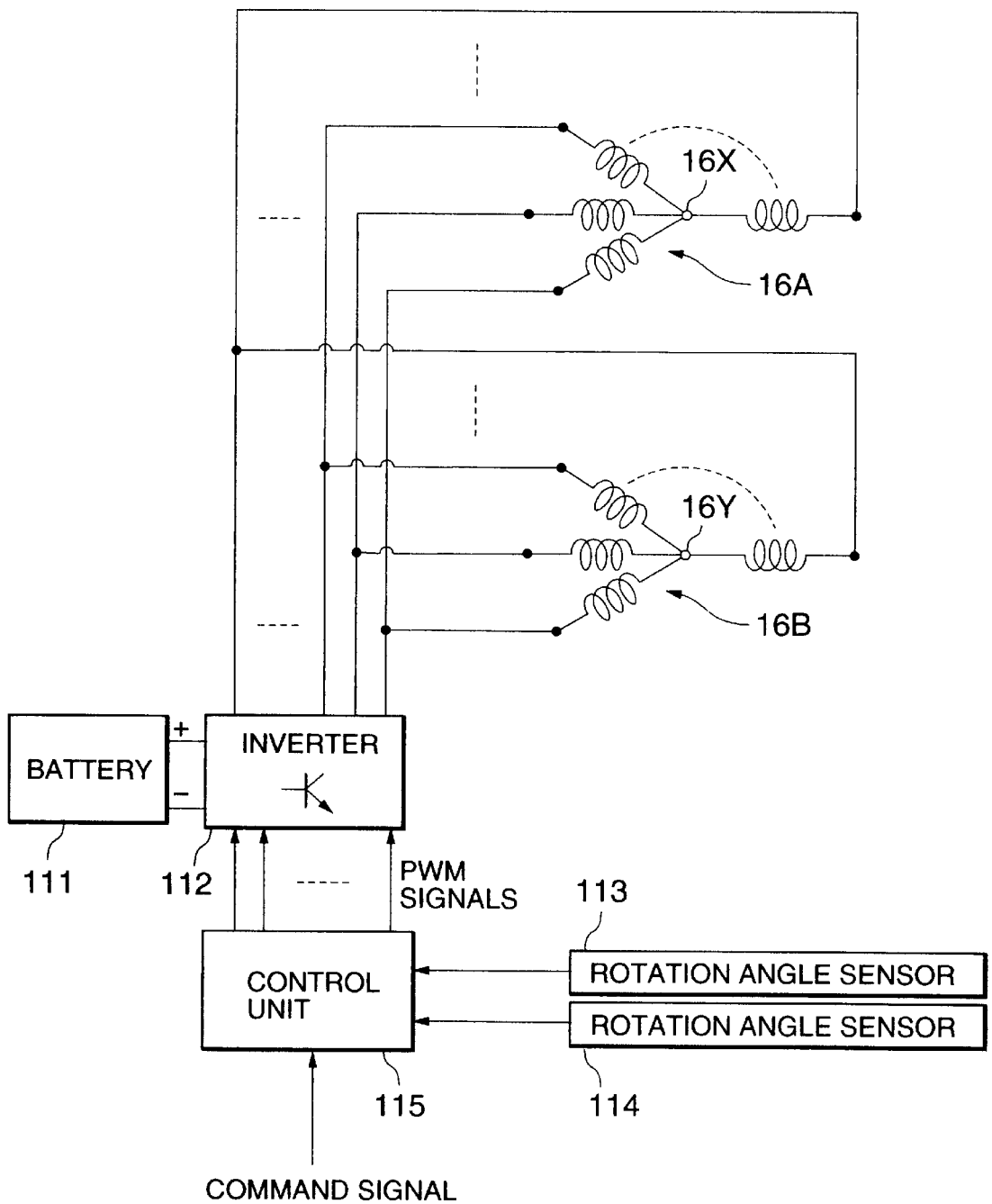
FIG. 6 is a block diagram of a current control device for the motor/generator according to the second embodiment of this invention.

Referring now to FIG. 6, a stator coil 16A and a stator coil 16B of the same phase are connected in parallel to one of the output terminals of the inverter 12. There are twelve pair of stator coils 16A and 16B respectively connected to the output terminals. The instantaneous current of a terminating point 16X of the stator coils 16A and that of a terminating point 16Y of the stator coils 16B are always zero. The other components of the second embodiment are identical to those of the first embodiment.

This embodiment resembles two motor/generators arranged in an axial direction. However the first rotor 2 and the second rotor 3 are independently driven by the single inverter 112 that supplies the composite alternating current to the stator coils 16A and 16B in the same manner as the first embodiment.

This embodiment also realizes a desirable supporting structure for the stator 14, the first rotor 2 and the second rotor 3.

Figure 7:
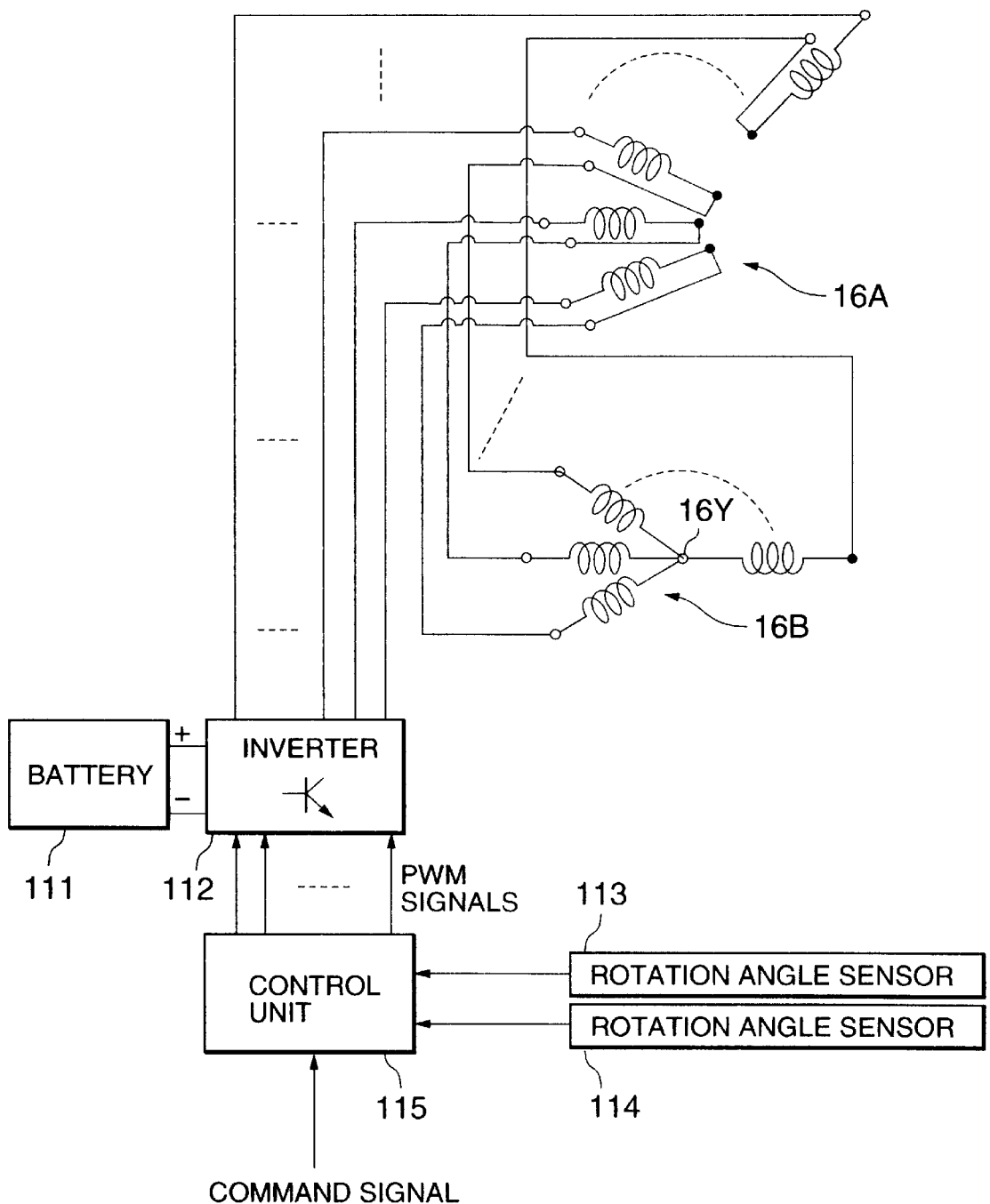
FIG. 7 is similar to FIG. 6, but showing a third embodiment of this invention.

A third embodiment of this invention will be described with reference to FIG. 7.

The disposition of the rotors and the stator in this embodiment is the same as the second embodiment. However the wiring of the stator coils 16A and 16B is different from that of the second embodiment.

In this embodiment, the stator coils 16A and 16B of each phase are connected in series to each of the output terminals of the inverter 112. Therefore only the stator coil 16B is provided with a terminating point 16Y. In this embodiment, the instantaneous current of the terminating point 16Y of the stator coils 16B has a value of zero. Thus it is possible to rotate the first rotor 2 and the second rotor 3 independently with a stable supporting structure.

Figure 8:
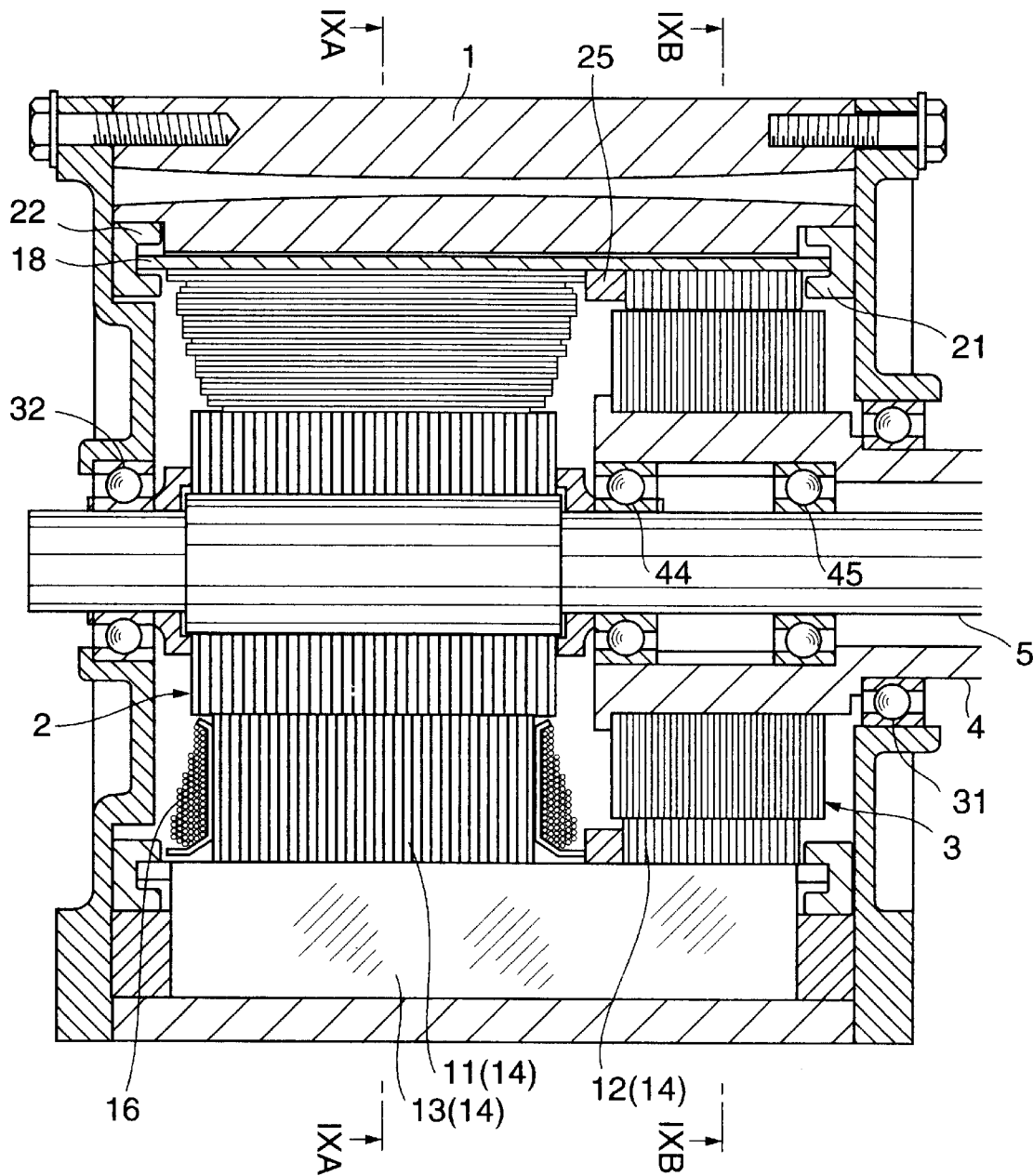
FIG. 8 is a longitudinal sectional view of a motor/generator according to a fourth embodiment of this invention.
Figure 9:
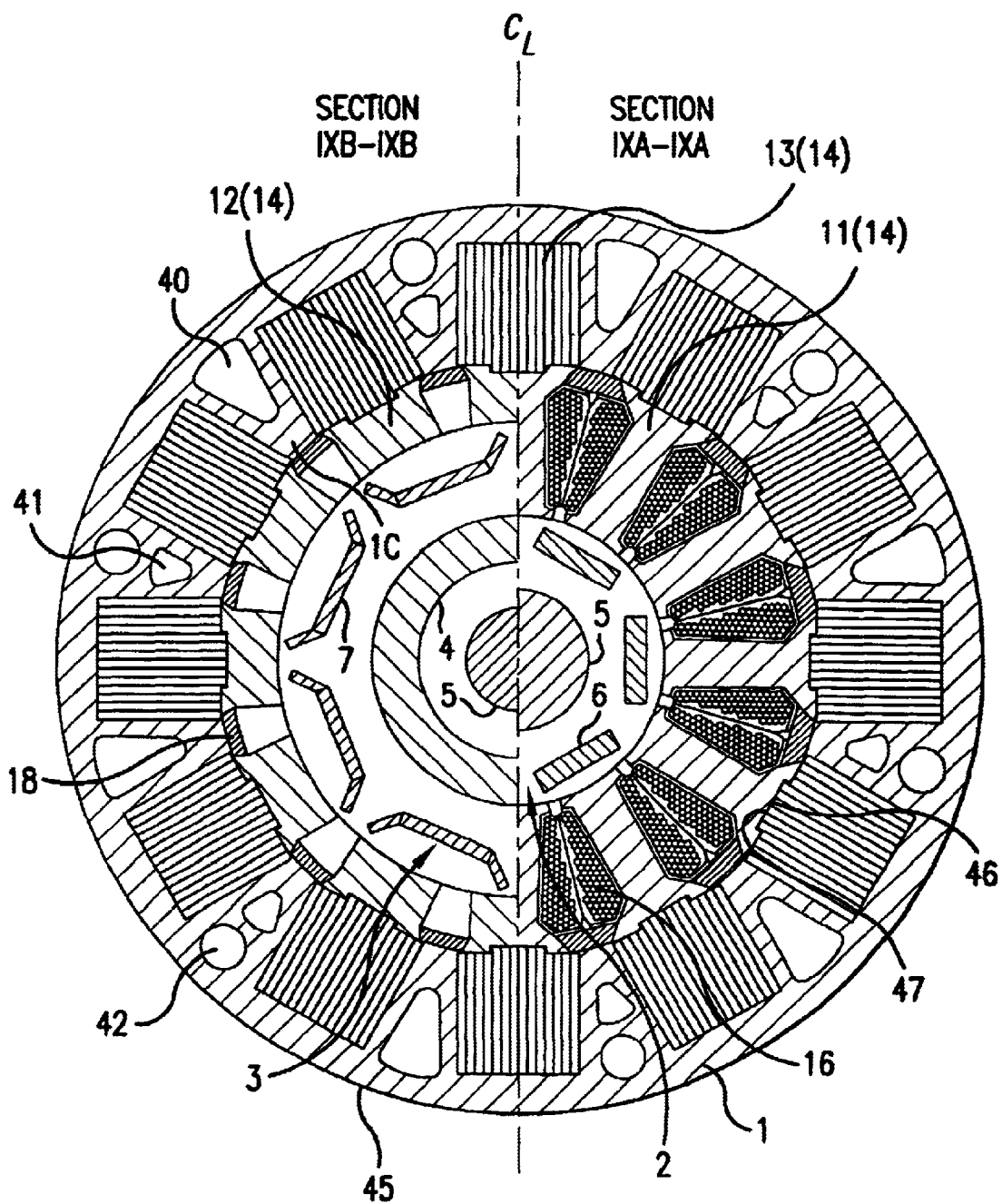
FIG. 9 is a cross-sectional view of the motor/generator according to the fourth embodiment of this invention taken along the line IXA—IXA and the line IXB—IXB in FIG. 8.

A fourth embodiment of this invention will be described with reference to FIGS. 8 and 9.

In this embodiment, the stator 14 comprises twelve first cores 11, twelve second cores 12 and twelve third cores 13. The first cores 11 are disposed on an outer side of the first rotor 11. The second cores 12 are disposed on an outer side of the second rotor 3. The third cores 13 are disposed on an outer side of the first cores 11 and the second cores 12. The third core 13 of each phase electrically connects the first core 11 and the second core 12. The first and second cores 11 and 12 are made of magnetic plate members which are respectively laminated in the direction of the rotating shaft 4.

Inward displacement of the first cores 11 and the second cores 12 is limited by the retaining plates 18 and the rings 21 and 22. The third cores 13 are made of magnetic plates laminated in the direction of the periphery of the cylindrical case 1 and are fitted respectively into the slots on the inner periphery of the case which is made of a non-magnetic material. Displacement towards the outer side of the first cores 11 and the second cores 12 is limited by the abutment of the third cores 13 with first cores 11 and second cores 12 of the same phase. Indentations 46 are respectively formed on an outer periphery of the first cores 11 and the second cores 12. A projection 47 fitting into the indentation 46 is formed on an inner periphery of the third cores 13. Thus displacement in the direction of the periphery of the first cores 11 and the second cores 12 is limited by the projection 47 fitting into the indentation 46.

A wall 1C of the case 1 made of a non-magnetic material is interposed between adjacent third cores 13.

In this embodiment, a magnetic flux is transmitted through the third cores 13 between first cores 11 and second cores 12 of the same phase.

Therefore, leakage of magnetic flux between adjacent second cores 12 and adjacent first cores 11 must be suppressed to low levels. In other words, magnetic reluctance between adjacent cores in a circumferential periphery should be much greater than the magnetic reluctance passing through the third cores 13 between first cores 11 and second cores 12 of the same phase.

This requirement is satisfied by, for example, providing a space between adjacent cores or sandwiching a non-magnetic member between adjacent cores. For the same reason, it is preferred that the retaining plates 18 is made of a non-magnetic material.

Stator coils 16 are wound on the first cores 11. Coils are not wound on the second cores 12 and the third cores 13.

In this motor/generator, it is possible to drive a first rotor 2 and the second rotor 3 independently with a single inverter by applying a composite alternating current to twelve stator coils 16.

In this embodiment, the polarity of the inner periphery of the first cores 11 is opposite to the polarity of the inner periphery of the second cores 12 of the same phase. This is due to the fact that the first cores 11 and the second cores 12 are electrically connected through the third cores 13. In contrast, in the second embodiment, the inner periphery of cores 11 and 12 with the same phase has the same polarity.

A plurality of first water jackets 40, second water jackets 41 and bolt holes 42 are formed approximately parallel to the rotating shaft 4 in the case 1 between the third cores 13. The stator coils 16 are heated by variations in the magnetic flux, but the motor/generator is easily cooled by passing a liquid coolant through the water jackets 40 and 41.

The outer periphery of the third cores 13 is covered with a magnetic shield 45 comprising a thin steel plate or a mesh plate. The shield 45 prevents leakage out of the case 1 of high frequency electromagnetic waves resulting from variations in magnetic flux inside the case 1.

The structure of the first rotor 2 and the second rotor 3 is the same as that described with reference to the first embodiment. However in this embodiment, ball bearings 44 and 45 are disposed between the rotating shaft 4 and the rotating shaft 5 instead of the needle bearings 30A and 30B in the first embodiment.

In this motor/generator, a reaction force is exerted on the stator 14 when it rotates the rotors 2 and 3.

However, since the third cores 13 of the stator 14 are respectively fitted into the slots of the case 1, the supporting structure of the stator 14 is very stable.

Also, the bearings 31 and 32, 44 and 45 create a stable supporting structure for the first rotor 2 and the second rotor 3.

Figure 10:
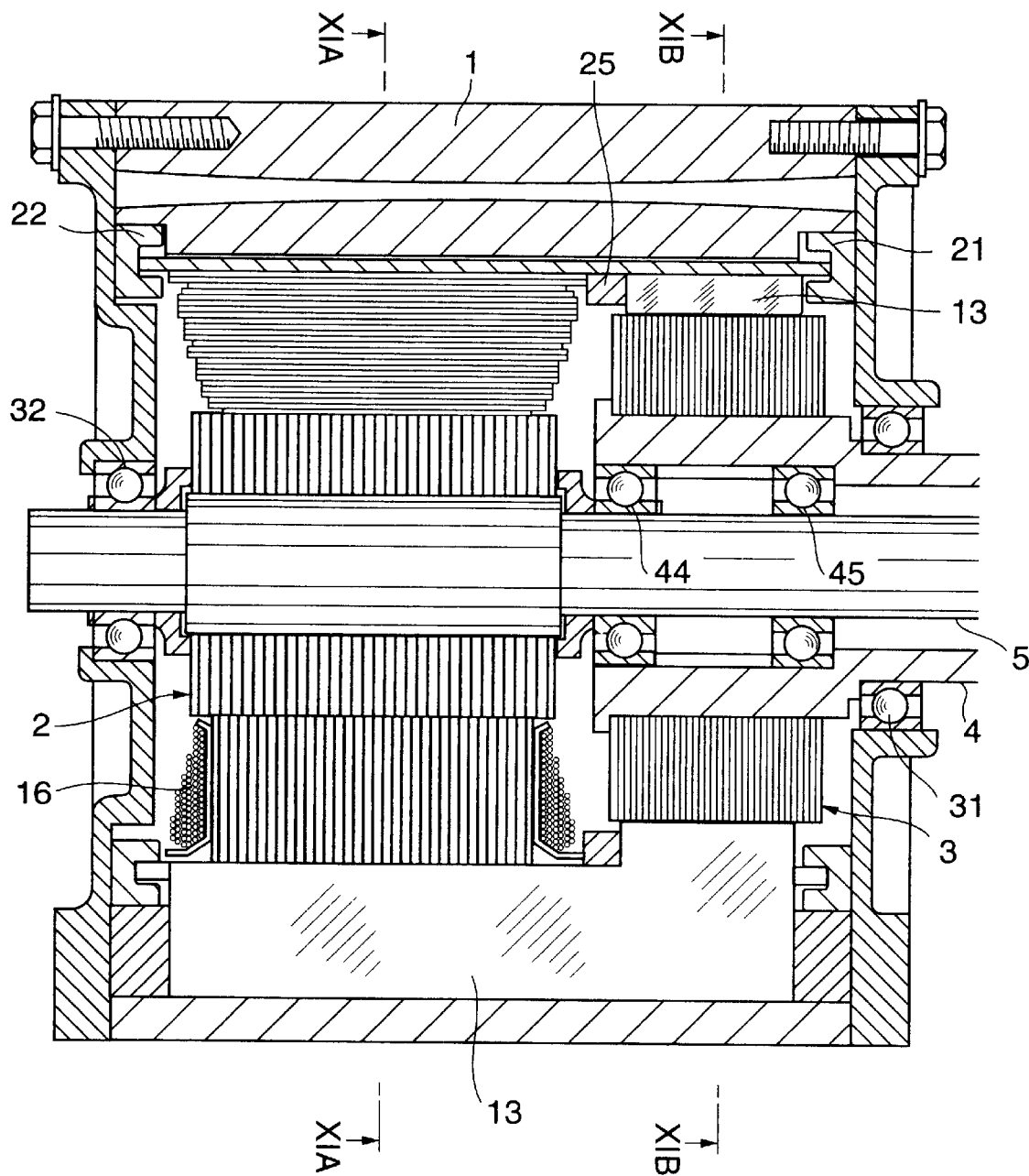
FIG. 10 is a longitudinal sectional view of a motor/generator according to a fifth embodiment of this invention.
Figure 11:
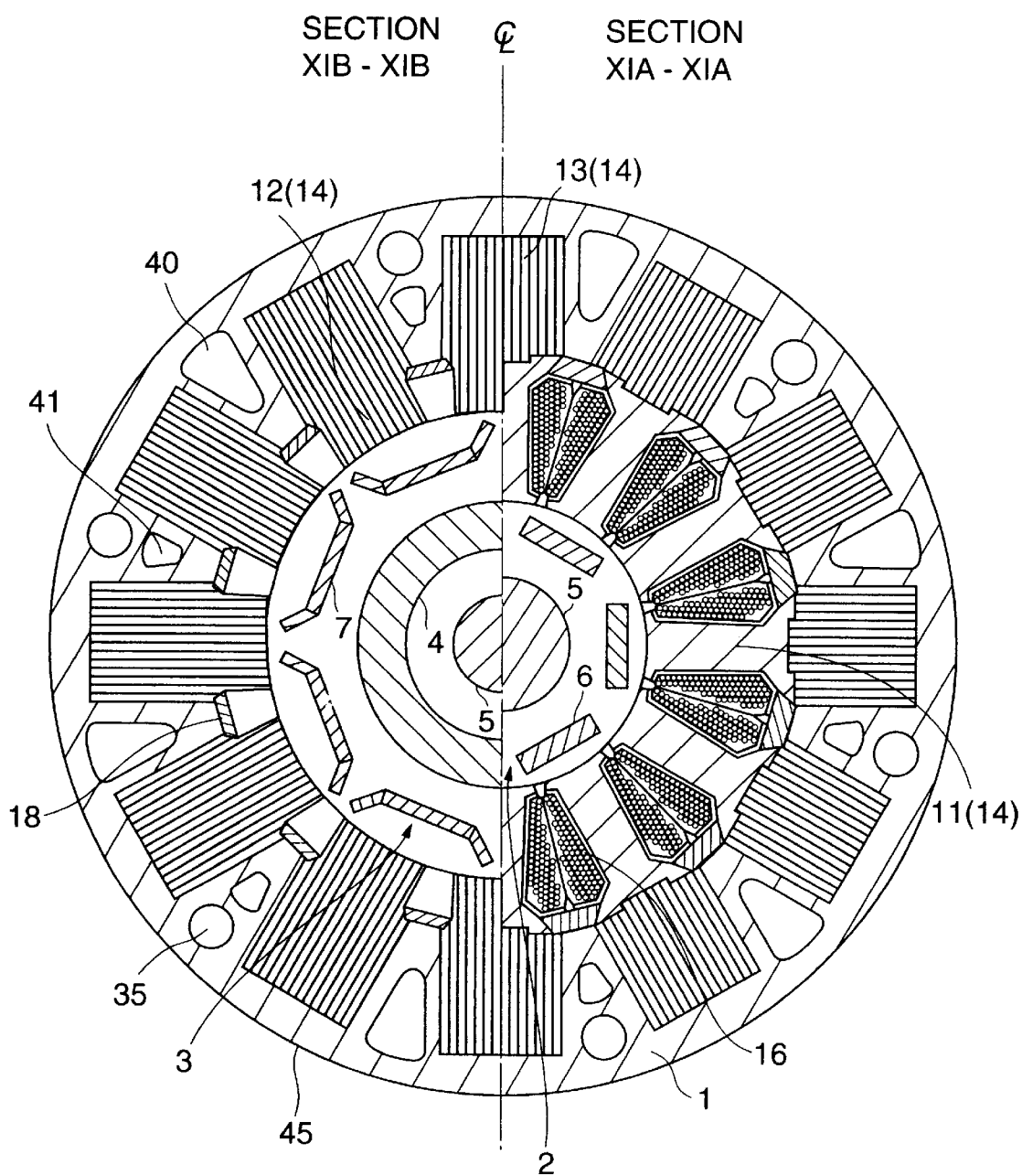
FIG. 11 is a cross-sectional view of the motor/generator according to the fifth embodiment of this invention taken along line XIA—XIA and the line XIB—XIB in FIG. 10.

A fifth embodiment of this invention will be described with reference to FIGS. 10 and 11.

In this embodiment, the structure of the stator 14 is different from that of the fourth embodiment. In this embodiment, the second cores 12 are replaced by projections formed on the third cores 13. The third cores 13 are made of magnetic plates laminated in the direction of the periphery of the cylindrical case 1 in the same manner as the fourth embodiment. Also, the third cores 13 are fitted into the slots of the case 1.

The same effect as that of the fourth embodiment is obtained in this embodiment while the structure of the stator 14 is simplified due to a fewer types of cores.

Figure 12:
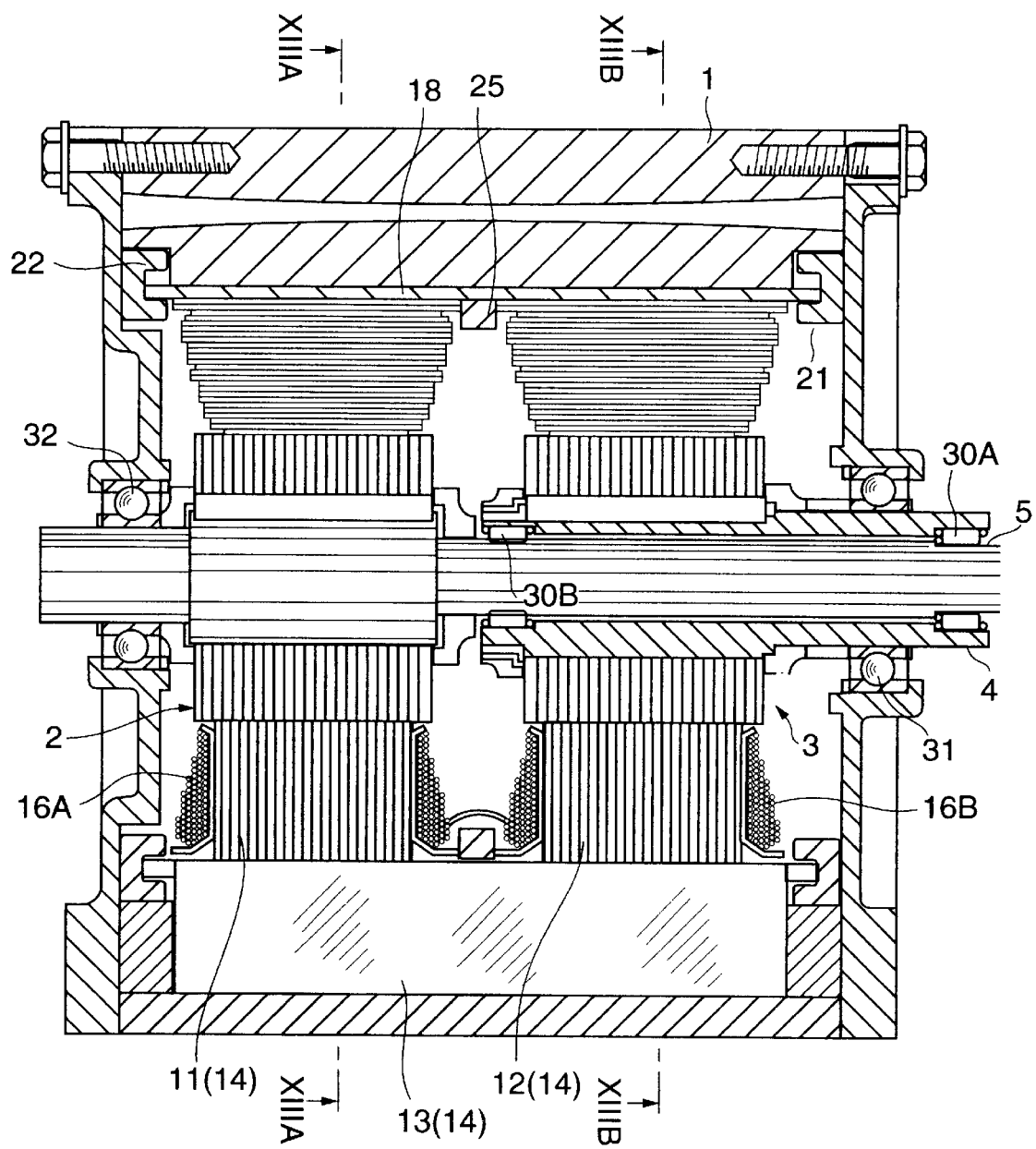
FIG. 12 is a longitudinal sectional view of a motor/generator according to a sixth embodiment of this invention.
Figure 13:
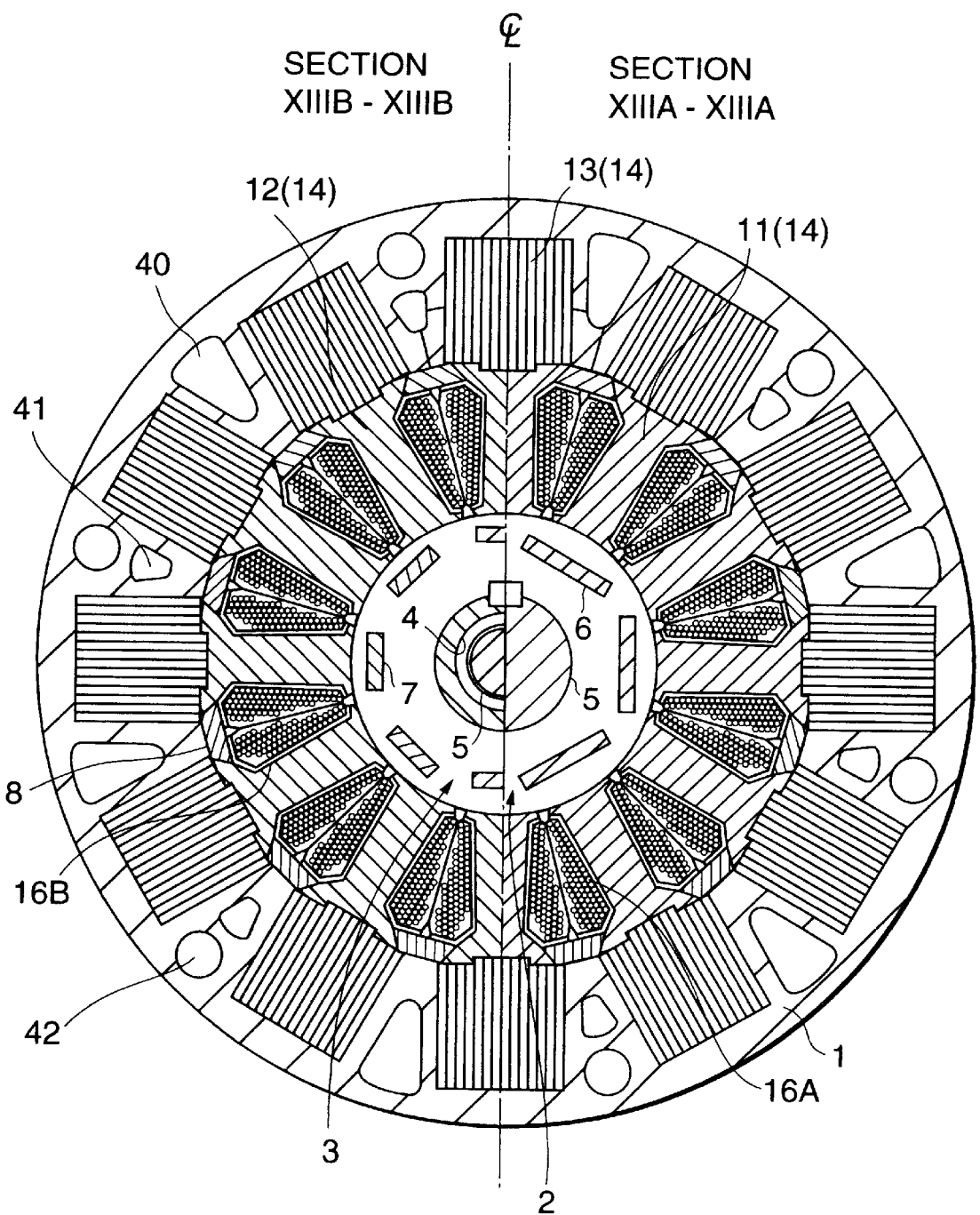
FIG. 13 is a cross-sectional view of the motor/generator according to a sixth embodiment of this invention taken along the line XIIIA—XIIIA and the line XIIIB—XIIIB in FIG. 12.

A sixth embodiment of this invention will be described with reference to FIGS. 12 and 13.

In this embodiment, the stator 14, in the same manner as the second embodiment, is provided with twelve first cores 11 disposed on an outer side of the first rotor 2 and twelve second cores 12 which are disposed on an outer side of the second rotor 3.

Stator coils 16A are wound on the first cores 11. Stator coils 16B are wound on the second cores 12.

However, in contradistinction to the second embodiment, the third cores 13 are provided on an outer side of the first cores 11 and the second cores 12 in the same manner as the fourth embodiment. In this embodiment, the first cores 11 and the second cores 12 of the same phase are electrically connected through the third cores 13.

Thus in contrast to the second embodiment, the polarity of the inner periphery of the first cores 11 and the inner periphery of second cores 12 of the same phase is opposite. The direction of winding of the stator coils 16A and 16B is preset not to interfere with this polarity characteristic.

In this embodiment also, various preferable effects similar to those of the fourth embodiment are obtained.

In all the first to sixth embodiments above, the first rotor 2 and the second rotor 3 are disposed along the rotation shaft 5 and the stator 14 is disposed on an outer side of the stators 2, 3. As a result, the diameter of the motor/generator can be smaller than the motor/generator that disposes the rotors 3 and 4 and the stator 14 to overlap in a radial direction.

A seventh embodiment of this invention will be described with reference to FIGS. 14A–14D.

In the first-sixth embodiments, the first rotor 2 and the second rotor 3 are disposed co-axially along the rotation shaft 5. The first rotor 2 and the second rotor 3 are accommodated in a single case 1 with the stator 14.

In this embodiment, the rotating shaft 4 of the first rotor 2 and the rotating shaft 5 of the second rotor 3 are not disposed co-axially. The first rotor 2 is provided with a six-pole magnet 6 and the second rotor 3 is provided with an eight-pole magnet 7. A stator 14A creating a rotating magnetic field for the first rotor 2 and a stator 14B creating a rotating magnetic field for the second rotor 3 are separately provided. The stators 14A and 14B are respectively provided with twelve coils 16A and 16B. The stator 14A and the first rotor 2 are accommodated in a case 1A. The stator 14B and the second rotor 3 are accommodated in a case 1B.

Coils 16A and 16B of the same phase are connected in series or in parallel to output terminals of an inverter which is formed in the same manner as that described in the first embodiment.

In this embodiment, it is possible to drive two motor/generator units that are substantially independent from each other by a composite alternating current supplied from a single inverter. The only necessary condition for the motor/generators is that the number of poles of the first rotor 1 and that of the second rotor 3 are different while the number of coils 16A of the stator 14A and the number of coils 16B of the stator 14B are the same.

The contents of Tokugan Hei 11-273303, with a filing date of Sep. 27, 1999 in Japan, and Tokugan Hei 11-274874, with a filing date of Sept. 28, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A motor/generator comprising:
   a first rotation shaft;
   a first rotor rotating with the first rotation shaft and having a first number of magnetic poles that form a first magnetic field;
   a second rotation shaft rotating relative to the first rotation shaft and supported co-axially with the first rotation shaft;
   a second rotor rotating with the second rotation shaft and having a second number of magnetic poles that form a second magnetic field, the first number and the second number being different, the first rotor and the second rotor being disposed in series along the first rotation shaft;
   a stator provided with coils each of which generates a first rotating magnetic field in synchronism with the first magnetic field by application of a first alternating current, and generates a second rotating magnetic field in synchronism with the second magnetic field by application of a second alternating current; and
   a current control device that supplies a composite current comprising the first alternating current and the second alternating current to each of the coils.

2. The motor/generator as defined in claim 1, wherein the stator is disposed facing an outer periphery of the first rotor and the second rotor.

3. The motor/generator as defined in claim 2, wherein the stator is provided with a plurality of core units separated in a peripheral direction, each core unit is provided with a first core facing an outer periphery of the first rotor and a second core facing an outer periphery of the second rotor and magnetically connected with the first core, and a magnetic reluctance between adjacent core units is set to be greater than a magnetic reluctance between the first core and the second core of the same core unit.

4. The motor/generator as defined in claim 2, wherein the stator comprises a plurality of cores disposed adjacent to one another, each core is provided with an inner peripheral part and an outer peripheral part, the outer peripheral part being in contact with an outer peripheral part of an adjacent core, the inner peripheral part projecting inward, and each of the coils being wound on the inner peripheral part.

5. A motor/generator as defined in claim 2, wherein the stator is provided with a plurality of core units separated in a peripheral direction, each core unit is provided with a first core facing an outer periphery of the first rotor and a second core facing an outer periphery of the second rotor and magnetically connected with the first core, each core unit is fixed on an inner periphery of a case that is made of a nonmagnetic material and is separated from each other by a wall made of a non-magnetic material as a part of the case.

6. The motor/generator as defined in claim 1, wherein each of the coils is wound on the first core of each core unit.

7. The motor/generator as defined in claim 6, wherein the motor/generator is further provided with coils each of which is wound on the second core of each core unit.

8. The motor/generator as defined in claim 1, wherein the stator is provided with a plurality of first cores facing an outer periphery of the first rotor and an equal number of second cores facing an outer periphery of the second rotor, each of the first cores being provided with an inner peripheral part and an outer peripheral part, the outer peripheral part of the first core being in contact with an outer peripheral part of an adjacent first core, the inner peripheral part of the first core projecting inward, each of the second cores being provided with an inner peripheral part and an outer peripheral part, the outer peripheral part of the second core being in contact with an outer peripheral part of an adjacent second core, the inner peripheral part of the second cores projecting inward, the coils comprising first coils each of which is wound on the inner peripheral part of the first core, and second coils each of which is wound on the inner peripheral part of the second core.

9. The motor/generator as defined in claim 8, wherein the first coils and the second coils are connected in parallel to the current control device.

10. The motor/generator as defined in claim 8, wherein the first coils and second coils are connected in series to the current control device.

11. The motor/generator as defined in claim 1, wherein the first rotation shaft penetrates the second rotation shaft, and the second rotation shaft is supported by a plurality of bearings so as to be free to rotate relative to the first rotation shaft.

12. The motor/generator as defined in claim 11, wherein the motor/generator further comprises a case accommodating the stator, a bearing supporting the first rotation shaft on the case and a bearing supporting the second rotation shaft on the case.

13. The motor/generator according to claim 1, further comprising a needle bearing coupled to the second rotation shaft and to the first rotation shaft.

14. A motor/generator comprising:

a first rotation shaft;

a first rotor rotating with the first rotation shaft and having a first number of magnetic poles that form a first magnetic field;

a second rotation shaft rotating relative to the first rotation shaft and supported co-axially with the first rotation shaft;

a second rotor rotating with the second rotation shaft and having a second number of magnetic poles that form a second magnetic field, the first number and the second number being different, the first rotor and the second rotor being disposed in series along the first rotation shaft;

a stator provided with coils that generate a first rotating magnetic field in synchronism with the first magnetic field by application of a first alternating current, and generate a second rotating magnetic field in synchronism with the second magnetic field by application of a second alternating current, wherein the stator is disposed facing an outer periphery of the first rotor and the second rotor, and wherein the stator is provided with a plurality of core units separated in a peripheral direction, each core unit is provided with a first core facing an outer periphery of the first rotor and a second core facing an outer periphery of the second rotor and magnetically connected with the first core, and a magnetic reluctance between adjacent core units is set to be greater than a magnetic reluctance between the first core and the second core of the same core unit, and wherein each core unit is further provided with a third core magnetically connecting the first core and the second core; and a current control device that supplies a composite current comprising the first alternating current and the second alternating current to the coils.

15. The motor/generator as defined in claim 14, wherein the first core comprises magnetic steel plates laminated in the direction of the first rotation shaft, the second core comprises magnetic steel plates laminated in the direction of the second rotation shaft, and the third core comprises magnetic steel plates laminated in the direction of a periphery of the stator.

16. A motor/generator comprising:

a first rotation shaft;

a first rotor rotating with the first rotation shaft and having a first number of magnetic poles that form a first magnetic field;

a second rotation shaft rotating relative to the first rotation shaft and supported co-axially with the first rotation shaft;

a second rotor rotating with the second rotation shaft and having a second number of magnetic poles that form a second magnetic field, the first number and the second number being different, the first rotor and the second rotor being disposed in series along the first rotation shaft;

a stator provided with coils that generate a first rotating magnetic field in synchronism with the first magnetic field by application of a first alternating current, and generate a second rotating magnetic field in synchronism with the second magnetic field by application of a second alternating current, wherein the stator is disposed facing an outer periphery of the first rotor and the second rotor, and wherein the stator is provided with a plurality of core units separated in a peripheral direction, each core unit is provided with a first core facing an outer periphery of the first rotor and a second core facing an outer periphery of the second rotor and magnetically connected with the first core, and a magnetic reluctance between adjacent core units is set to be greater than a magnetic reluctance between the first core and the second core of the same core unit, and wherein the first core comprises magnetic steel plates laminated in the direction of the first rotation shaft, and the second core comprises magnetic steel plates laminated in the direction of a periphery of the stator; and a current control device that supplies a composite current comprising the first alternating current and the second alternating current to the coils.

17. A motor/generator comprising:

a first rotation shaft;

a first rotor rotating with the first rotation shaft and having a first number of magnetic poles that form a first magnetic field;

a second rotation shaft rotating relative to the first rotation shaft and supported co-axially with the first rotation shaft;

a second rotor rotating with the second rotation shaft and having a second number of magnetic poles that form a second magnetic field, the first number and the second number being different, the first rotor and the second rotor being disposed in series along the first rotation shaft;

a stator provided with coils that generate a first rotating magnetic field in synchronism with the first magnetic field by application of a first alternating current, and generate a second rotating magnetic field in synchronism with the second magnetic field by application of a second alternating current, wherein the stator is disposed facing an outer periphery of the first rotor and the second rotor, and wherein the stator is provided with a plurality of core units separated in a peripheral direction, each core unit is provided with a first core facing an outer periphery of the first rotor and a second core facing an outer periphery of the second rotor and magnetically connected with the first core, and a magnetic reluctance between adjacent core units is set to be greater than a magnetic reluctance between the first core and the second core of the same core unit, and wherein the stator is accommodated in a case that has a passage of liquid coolant, and supported inward by the case; and a current control device that supplies a composite current comprising the first alternating current and the second alternating current to the coils.

18. A motor/generator comprising:

a first rotation shaft;

a first rotor rotating with the first rotation shaft and having a first number of magnetic poles that form a first magnetic field;

a second rotation shaft rotating relative to the first rotation shaft and supported co-axially with the first rotation shaft;

a second rotor rotating with the second rotation shaft and having a second number of magnetic poles that form a second magnetic field, the first number and the second number being different, the first rotor and the second rotor being disposed in series along the first rotation shaft;

a stator provided with coils that generate a first rotating magnetic field in synchronism with the first magnetic field by application of a first alternating current, and generate a second rotating magnetic field in synchronism with the second magnetic field by application of a second alternating current, wherein the stator is disposed facing an outer periphery of the first rotor and the second rotor, and wherein the stator is provided with a plurality of core units separated in a peripheral direction, each core unit is provided with a first core facing an outer periphery of the first rotor and a second core facing an outer periphery of the second rotor and magnetically connected with the first core, and a magnetic reluctance between adjacent core units is set to be greater than a magnetic reluctance between the first core and the second core of the same core unit;

a magnetic shield surrounding an outer periphery of the stator; and a current control device that supplies a composite current comprising the first alternating current and the second alternating current to the coils.

19. A motor/generator comprising:

a first rotation shaft;

a first rotor rotating with the first rotation shaft and having a first number of magnetic poles that form a first magnetic field;

a second rotation shaft rotating relative to the first rotation shaft, the second rotation shaft and the first rotation shaft having different rotation axes;

a second rotor rotating with the second rotation shaft and having a second number of magnetic poles that form a second magnetic field, the first number and the second number being different;

a first stator provided with a third number of first coils that generate a first rotating magnetic field in synchronism with the first magnetic field by application of a first alternating current;

a second stator provided with a fourth number of second coils, the third number and the fourth number being equal, the second coils generating a rotating magnetic field in synchronism with second magnetic field by application of a second alternating current; and a current control device that supplies a composite current comprising the first alternating current and the second alternating current to the first coils and the second coils.

20. The motor/generator as defined in claim 19, wherein the first coils and the second coils are connected in series to the current control device.

21. The motor/generator as defined in claim 19, wherein the first coils and the second coils are connected in parallel to the current control device.

* * * * *